United States Patent [19]
Kaneko et al.

[11] 3,912,180
[45] Oct. 14, 1975

[54] APPARATUS FOR MANUFACTURING ANNULAR HELIX WIRE BEADS

[75] Inventors: Fuminori Kaneko; Kashirou Ureshino; Ichiro Miyata; Masahiro Tomita, all of Kobe, Japan

[73] Assignee: Kobe Steel Ltd., Kobe, Japan

[22] Filed: May 23, 1973

[21] Appl. No.: 363,195

[30] Foreign Application Priority Data
May 23, 1972 Japan.............................. 47-50391

[52] U.S. Cl............................................ 242/4 BE
[51] Int. Cl.²........................................ B65H 81/02
[58] Field of Search.......... 242/4 R, 4 A, 4 B, 4 BE; 156/422, 136; 245/105; 57/13, 14, 15, 21

[56] References Cited
UNITED STATES PATENTS

| | | |
|---|---|---|
| 2,516,734 | 7/1950 | Van den Berge et al......... 242/4 BE |
| 3,673,785 | 7/1972 | Cullen et al...................... 242/7.02 |

*Primary Examiner*—Billy S. Taylor
*Attorney, Agent, or Firm*—Oblon, Fisher, Spivak, McClelland & Maier

[57] ABSTRACT

Apparatus for manufacturing annular helix wire beads for use in motor vehicle tires is disclosed wherein winding wire is wound upon an annular core wire. The core wire is rotatably driven about its axis by suitable drive means and a wire drum is provided for storing the winding wire, the drum being mounted within a rotatable support mechanism. The drum support mechanism is in turn rotatably supported within a rotary body whereby as the winding wire is fed from the drum, the winding wire may be wrapped about the core wire. Drive means are also provided for driving the rotary body and transmission means are also included so as to rotate the drum support mechanism relative to the rotary body. A wire guide extends from the rotary axis of the drum support mechanism to the rotary axis of the rotary body so as to define a guide path for the winding wire between the wire drum and the core wire, and the rotary speeds of the various components are appropriately predetermined so as to attain a helical bead having a desired configuration and stress distribution.

11 Claims, 9 Drawing Figures

APPARATUS FOR MANUFACTURING ANNULAR HELIX WIRE BEADS

BACKGROUND OF THE INVENTION

1. Field of the Invention

The present invention relates generally to apparatus for manufacturing wire beads and more particularly to apparatus for manufacturing annular helix wire beads which may be subsequently used in the manufacture of motor vehicle tires.

2. Description of the Prior Art

Annular helix wire beads are known to be particularly useful in manufacturing vehicle tires as such beads are far superior to beads which merely consist of a combination of annular wires due to the fact that the load imposed upon each wire within the helix beads is equal, the process of coating the surface of each wire with rubber prior to the tire manufacture is not required, and the overall strength of the tire is substantially improved due to the excellent affinity between such beads and the rubber within the tires.

Industrial manufacture of annular helix beads however is quite difficult since the helix wire drum must move through an area surrounded by the annular core wire in order to be able to wind the wire fed from the wire drum about the annular core wire. Furthermore, in order to attain the predetermined configuration and internal stresses of the wound wire, it is necessary to control the spatial relationship between the location at which the wire is wound and the location at which the wire is fed from the drum, as well as the tension and torsional forces imposed upon the wire, such controls not having beein attained by conventional apparatus.

SUMMARY OF THE INVENTION

Accordingly, it is an object of the present invention to provide an improved apparatus for manufacturing annular helix wire beads.

Another object of the present invention is to provide an improved apparatus for manufacturing annular helix wire beads which overcomes the aforementioned difficulties encountered within conventional apparatus.

Still another object of the present invention is to provide an improved apparatus for manufacturing annular helix wire beads simply, efficiently, and economically.

Yet another object of the present invention is to provide an improved apparatus for manufacturing annular helix wire beads of high quality.

A further object of the present invention is to provide an improved apparatus for manufacturing annular helix wire beads having the requisite configuration and internal and torsional stress distribution.

A yet further object of the present invention is to provide an improved apparatus for manufacturing annular helix wire beads which facilitates a substantial increase in production of annular helix wire beads.

The foregoing objectives are achieved according to this invention through the provision of an apparatus for manufacturing annular helix wire beads wherein wire is wound upon an endless annular core wire and the apparatus includes a core wire drive mechanism for rotating the core wire about its axis, a wire drum about which the winding wire is stored, a drum support mechanism for rotatably supporting the wire drum, a rotary body for rotatably supporting the drum support mechanism and for rotating the same about the core wire, the body being provided with a slit through the core wire may be passed, and a rotary body drive mechanism for rotatably driving the rotary body. As the drum support mechanism is rotatably mounted upon the rotary body, the winding wire fed from the wire drum is subjected to a torsion corresponding to the rotation of the drum support mechanism, and it is possible to substantially eliminate the torsional stress within the wire by rotating the drum support mechanism at a specific number of revolutions relative to the rotary body.

The rotary body rotates about a portion of the annular core wire within a plane intersecting the plane including the annulus of the core wire, and the wire drum and drum support mechanism, both mounted upon the rotary body, also rotates around the core wire. Due to such motion, the winding wire is helically wound upon the core wire, the wire drum rotating about the core wire while feeding the winding wire. A further characteristic motion resides in the drum support mechanism, which rotatably supports the wire drum, being mounted so as to be able to also rotate with respect to the rotary body, thereby being rotated by the torsional force produced within the wire, or an external force. This permits torsional stress within the wire wound upon the core wire to be maintained at a proper value.

To more effectively manufacture the annular helix bead, in addition to the construction described above, the apparatus may include means whereby the feeding direction of the winding wire may be altered, and a wire guide may be provided so as to rotate in synchronism with the rotary body, the wire guide being preferably mounted upon the rotary body. The provision of this wire guide solves such problems that when the winding wire is linearly stretched between its position of contact with the core wire and the wire drum, the distance varies with rotation of the rotary body and the drum support mechanism, thereby resulting in non-uniformity of the wire feeding rate and tension. Despite the displacement of the wire drum with respect to the rotary body, this wire guide maintains a constant distance between the outlet of the wire drum and the position initiating contact between the winding wire and the core wire by changing its direction within the feeding path of the winding wire. This permits both the shape and internal stress of the wound wire to be proper.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several view, and wherein.

DETAILED DESCRIPTION OF THE PREFERRED EMBODIMENTS

Figure 1:
FIG. 1 is a schematic view of one embodiment of an annular helix wire bead which may be manufactured by the apparatus of the present invention.
Figure 2:
FIG. 2 is a schematic view of another embodiment of an annular helix wire bead which may be manufactured by the apparatus of the present invention.
Figure 4:
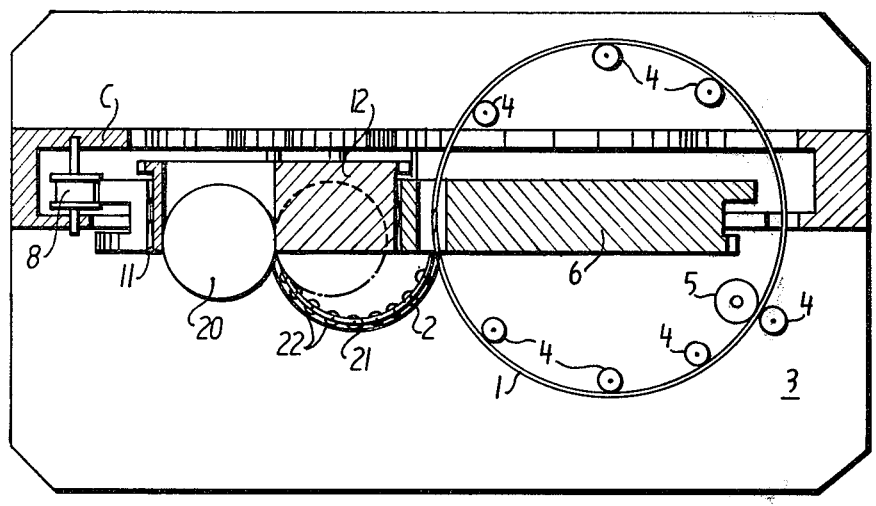
FIG. 4 is a cross-sectional view taken along the line A—A of FIG. 3.
Figure 3:
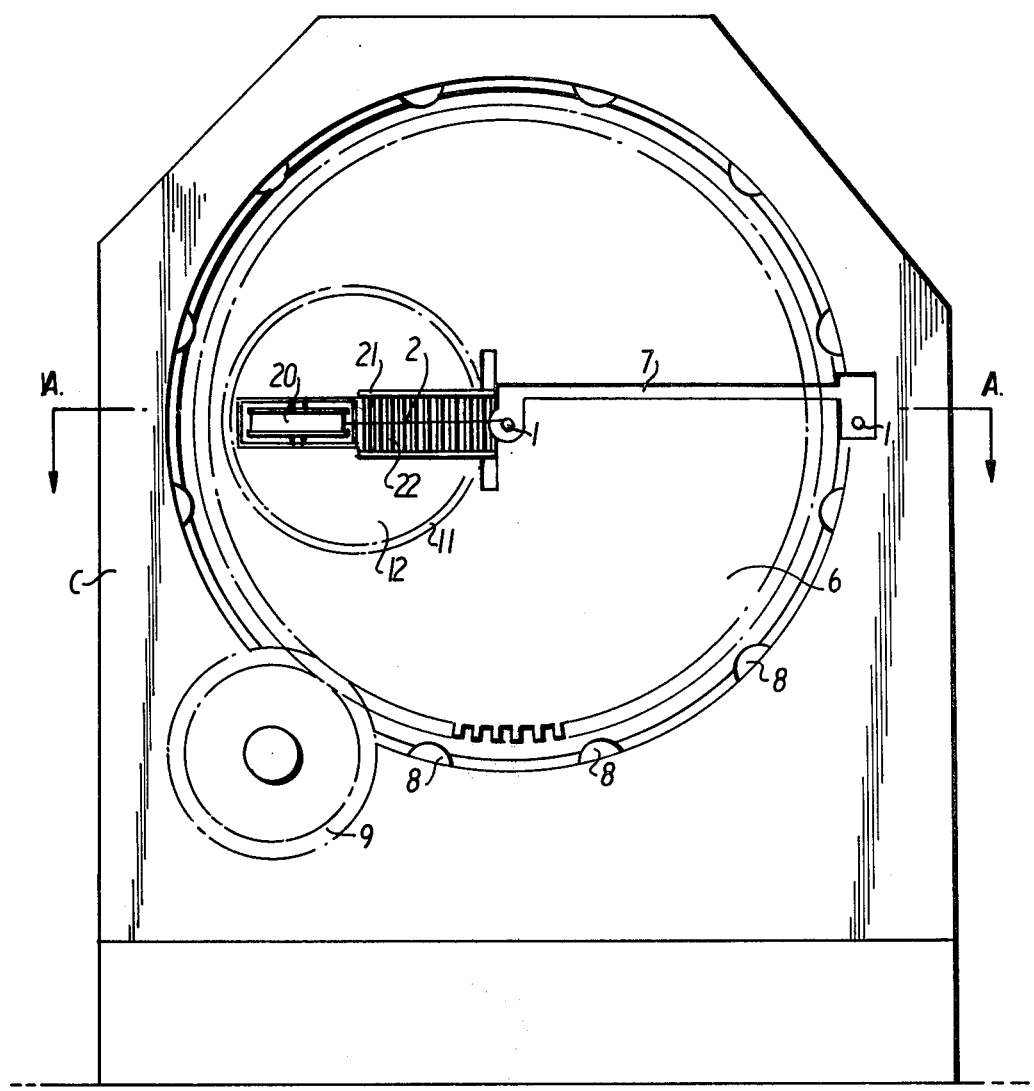
FIG. 3 is a front elevation view illustrating one embodiment of the apparatus constructed according to the present invention and showing its cooperative parts.
Figure 5:
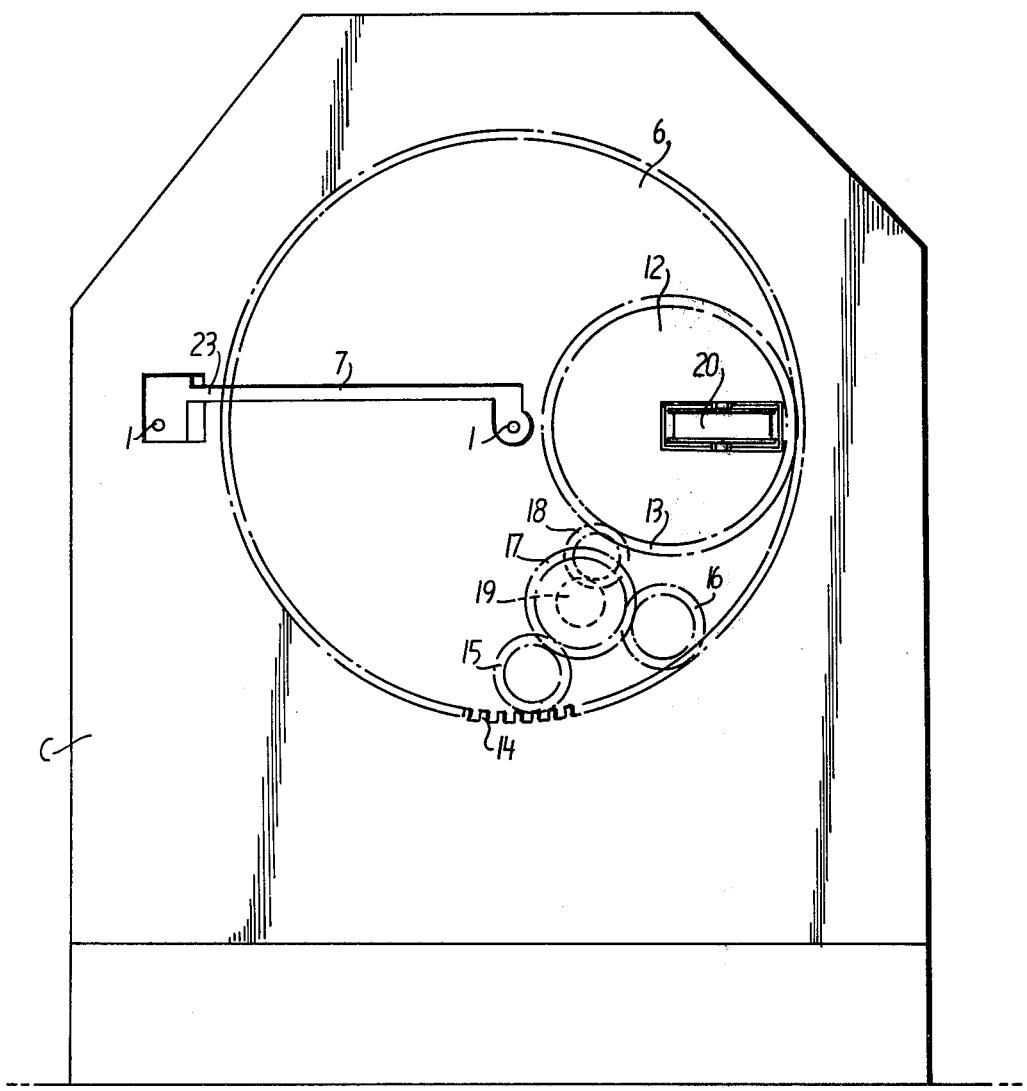
FIG. 5 is a rear elevation view of the apparatus illustrated in FIG. 3.

Referring now to the drawings, and more particularly to FIGS. 1 and 2 thereof, two embodiments of annular helix wires beads which may be manufactured by the apparatus of the present invention are respectively illustrated as including an endless core wire 1 having finer wires 2 helically wound therearound, or alternatively, a plurality of fine wires 2 helically intertwined together. As shown in FIGS. 3–5, in order to rotate the endless annular core wire 1 in a direction about its axis, one embodiment of the present invention includes a core wire drive mechanism generally indicated by the reference character 3 which is disposed adjacent to the annulus of the core wire 1, as particularly shown in FIG. 4, and which comprises a plurality of rollers 4 disposed along the interior and exterior peripheral surfaces of the core wire in order to continuously feed and circulate the same in the peripheral direction of the annulus while retaining the core wire within the horizontal plane. The rollers 4 cooperate with and transmit the rotational force of a drive roller 5 to core wire 1 and are arranged so that they embrace the core wire 1 with a constant force regardless of any variation in the core wire diameter.

A portion of a rotary body 6 is so disposed as to be able to rotate within the area defined by the annular core wire 1, rotary body 6 being provided with a radially extending slit 7 which allows the core wire 1 to be passed therethrough so as to be properly located relative thereto, whereupon one portion of the periphery of wire 1 is located at the center of body 6 while a diametrically opposite peripheral portion of wire 1 is adjacent the periphery of body 6, the diameter of wire 1 thus being slightly larger than the radius of body 6. Wire 1 and body 6 thereby rotate in mutually perpendicular intersecting planes, body 6 being rotatably supported by means of roller wheels 8 circumferentially provided within a casing C, and arranged to be driven by means of a drive gear 9 which intermeshes with gear teeth 10 provided upon the periphery of rotary body 6.

A winding wire drum support mechanism 12 is rotatably mounted within the rotary body 6 through means of a circumferential bearing 11, and as shown in FIG. 5, the periphery of mechanism 12 is formed with a rolling gear 13 which meshes with a reduction or driving gear 18 which in turn meshes with a reduction or driving gear 19, another reduction or driving gear 17 coaxially mounted with gear 19 meshing wiith two running gears 15 and 16 which similarly mesh with gear teeth 14 provided upon the inner periphery of the stationary casing C. The drum support mechanism 12, the reduction driving gears 17, 18 and 19, and the running gears 15 and 16 are thus respectively rotatably mounted upon the rotary body 6 so as to provide a transmission mechanism in order to rotate the drum support mechanism 12 with respect to the rotary body 6 when the rotary body 6 rotates with respect to the casing C.

The drum support mechanism 12 rotatably supports a winding wire drum 20 upon which is stored a supply of winding wire 2. A wire guide 21 is secured to the rotary body 6 in order to properly direct the wire 2 from the rotational axis of the drum support mechanism 12 to the rotational axis of the rotary body 6, the locus of the course of wire 2 during such movement being a curved line. The wire guide 21 comprises a plurality of rollers 22 which thus serve to guide wire 2 smoothly, without harmful internal stresses or deformation thereof, from drum 20 to a position adjacent core wire 1 so as to be subsequently wound therearound, and independently of the rotation of mechanism 12.

The core wire drive mechanism operating the drive roller 5 and the rotary body drive mechanism operating drive gear 9 are of course synchronously operated so as to attain the proper helical pitch, that is, the predetermined distance that the core wire moves during the time the winding wire is wound one turn therearound, and the rotation of the wire drum 20, with respect to the drum support mechanism 12, is appropriately damped so as to effect a proper tension within the wire 2.

During manufacture, the endless core wire 1 and a portion of the helically wound winding wire 2 are positioned within an aperture located at the rotational axis of the rotary body 6, after having passed through the slit 7, the core wire 1 being connected with the core wire drive mechanism, while the winding wire 2 is prewound around the wire drum 20 and positioned adjacent the core wire 1 through means of the wire guide 21. When in this condition, the core wire drive mechanism 3 and the rotary body drive mechanism are operated, the core wire 1 rotates in the clockwise direction as seen in FIG. 4, and the rotary body 6 including the wire drum 20, rotates in the counterclockwise direction as seen in FIG. 3, as a result of which the wire 2 is fed from the wire drum 20 and wound around the core wire 1.

Simultaneously with the rotation of the rotary body 6, the drum support mechanism 12 rotates relative to the rotary body 6 through means of the transmission mechanism provided upon the rotary body 6, and consequently, such rotation of the wire drum mechanism 12 will cause an independent rotational component to be imposed upon the drum 20 so as to appropriately feed wire 2 while producing a desirable degree of torsion therewithin.

In view of the rotation of the drum support mechanism 12 and the rotation of the rotary body 6, the wire guide 21 is able to maintain the length of the wire 2 between the outlet of the wire 2 from the wire drum 20 and the position at which the wire 2 is wound around the core wire 1 constant whereby the defects which normally occur when the wire 2 is wound around the core wire 1 directly from the wire drum 20 without the presence of wire guide 21 are eliminated, such as, for example, a change in the feeding angle of the wire 2 with respect to the feeding direction of the core wire 1 corresponding to the rotation of the rotary body 6, and a change in the length of wire 2 between the outlet of the wire 2 from the wire drum and the position at which the wire 2 is wound around the core wire 1 corresponding to the rotation of the rotary body 6 as well as the non-uniformity of the rotational speed of the wire drum 20.

It is noted that since the two running gears 15 and 16 within the transmission mechanism mesh with the gear teeth 14 of the casing C, the absence of such gear teeth 14 within the vicinity of a slit 23 provided upon the casing C for facilitating the passage of the core wire 1 within the casing does not affect the positive transmission of the rotational movement to the drum support mechanism due to the fact that at least one of the two gears positively meshes with the gear teeth 14 at all times. Similarly, a plurality of drive gears 9 may be provided within the rotary body drive mechanism.

Figure 6:
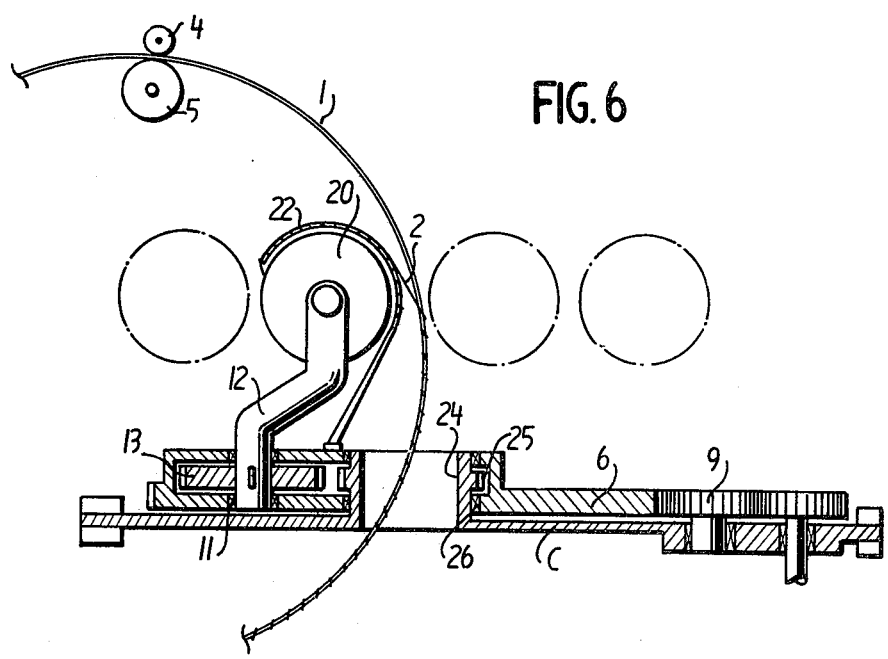
FIG. 6 is a view similar to that of FIG. 4 showing however another embodiment of the present invention.
Figure 7:
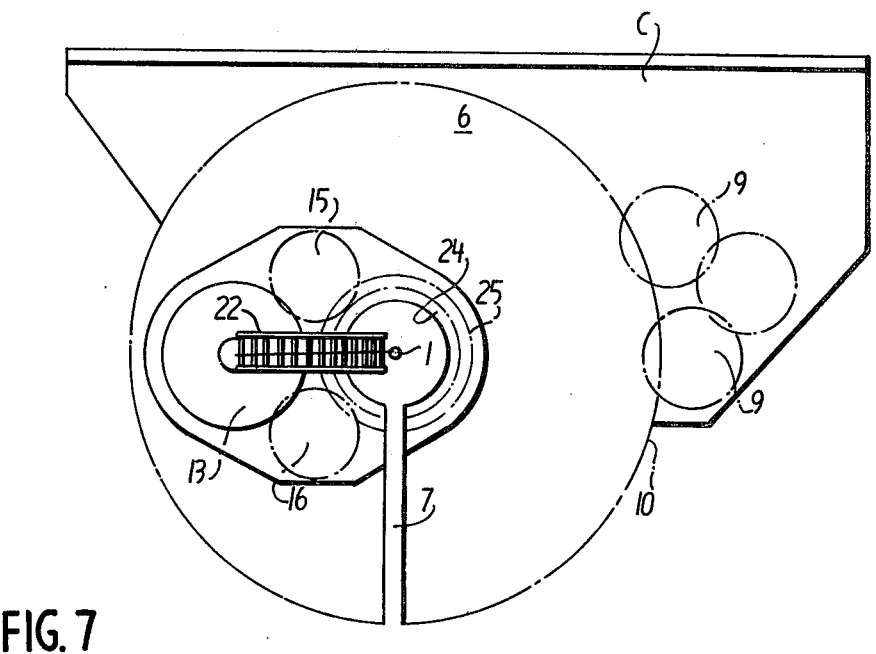
FIG. 7 is a side elevation view of the apparatus of FIG. 6.

Referring now to FIGS. 6 and 7, a second embodiment of the present invention includes a core wire 1 being rotated and circulated within a horizontal plane by means of a roller 4 and a corresponding drive roller 5 of the core wire drive mechanism. A casing C includes a hollow cylindrical portion 24 upon the periphery of which there is provided an outer gear 25, a rotary body 6 being rotatably mounted upon portion 24 through means of peripheral bearings 26. In order to rotate the rotary body 6, drive gears 9 disposed within casing C mesh with gear teeth 10 provided upon the outer periphery of the rotary body 6, a transmission mechanism also being provided upon an inner portion of rotary body 6 so as to mesh with the outer gear 25 and rotate a drum support mechanism 12 independent of the rotational movement between the rotary body 6 and the casing C.

The transmission mechanism includes running gears 15 and 16 meshing with the outer gear 25, and a rolling gear 13 connected to the drum support mechanism 12 which is rotatably mounted with respect to the rotary body 6 through means of a bearing 11, the rotation of the rotary body 6 thereby causing the relative rotation of the drum support mechanism 12. The drum support mechanism 12 rotatably carries a winding wire drum 20 at a position radially offset from the axis of rotation of mechanism 12, a wire guide 21 having rollers 22 being secured to the rotary body 6 so as to direct the wire 2 from the wire drum 20 to the position adjacent core wire 1 as the wire drum 20 rotates about the axis of rotation of the drum support mechanism 12.

In addition to the rotational movement for feeding the wire 2 and the rotational movement for rotating wire 2 around the core wire 1, the wire drum 20 also acquires the rotation about the axis of rotation of the drum support mechanism 12, and therefore, it is possible to maintain the torsion produced within the winding wire 2 at a predetermined value. While such rotation for correction of the torsion considerably changes the positional relationship between the wire 2 fed from the wire drum 20 and the annular core wire 1, the feeding direction can be altered by means of the wire guide 21 so as to maintain constant the final feeding position of wire 2 with respect to the core wire 1 and the angle of inclination of such wire 2 with respect to the direction of movement of the core wire 1. It is noted that since the embodiment of FIGS. 6 and 7 utilizes the outer gear 25, it is not necessary to employ a large inner gear and a large casing, and therefore, the entire apparatus is quite compact.

Figure 8:
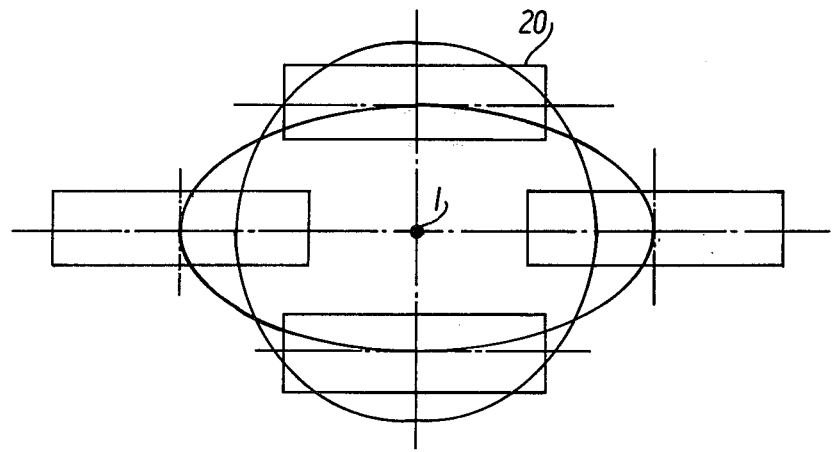
FIG. 8 is a schematic diagram showing the position of the drum and the position of the core wire when the drum support mechanism is moved along an elliptical path.

Turning now to FIG. 8 the movement of the wire drum 20 is illustrated wherein the drum is moved along an elliptical path without changing its angle relative to the stationary casing C. In order to cause the movement of the rotary body 6 as shown in FIG. 8, a transmission mechanism is utilized to cause one revolution drum support mechanism 12 in the reverse direction relative to rotary body 6 as the rotary body 6 rotates one revolutiion with respect to the casing C. As an alternative, an eccentric mechanism can also be provided so as to alter the distance from the center of rotation of the rotary body 6 to the center of rotation of the drum support mechanism 12 in synchronism with the rotation of the rotary body 6. In this case, although the winding wire guide 21 cannot be provided, the wire drum 20 can be moved adjacent the core wire 1 in order to nevertheless operate the apparatus at a high rate of speed.

Figure 9:
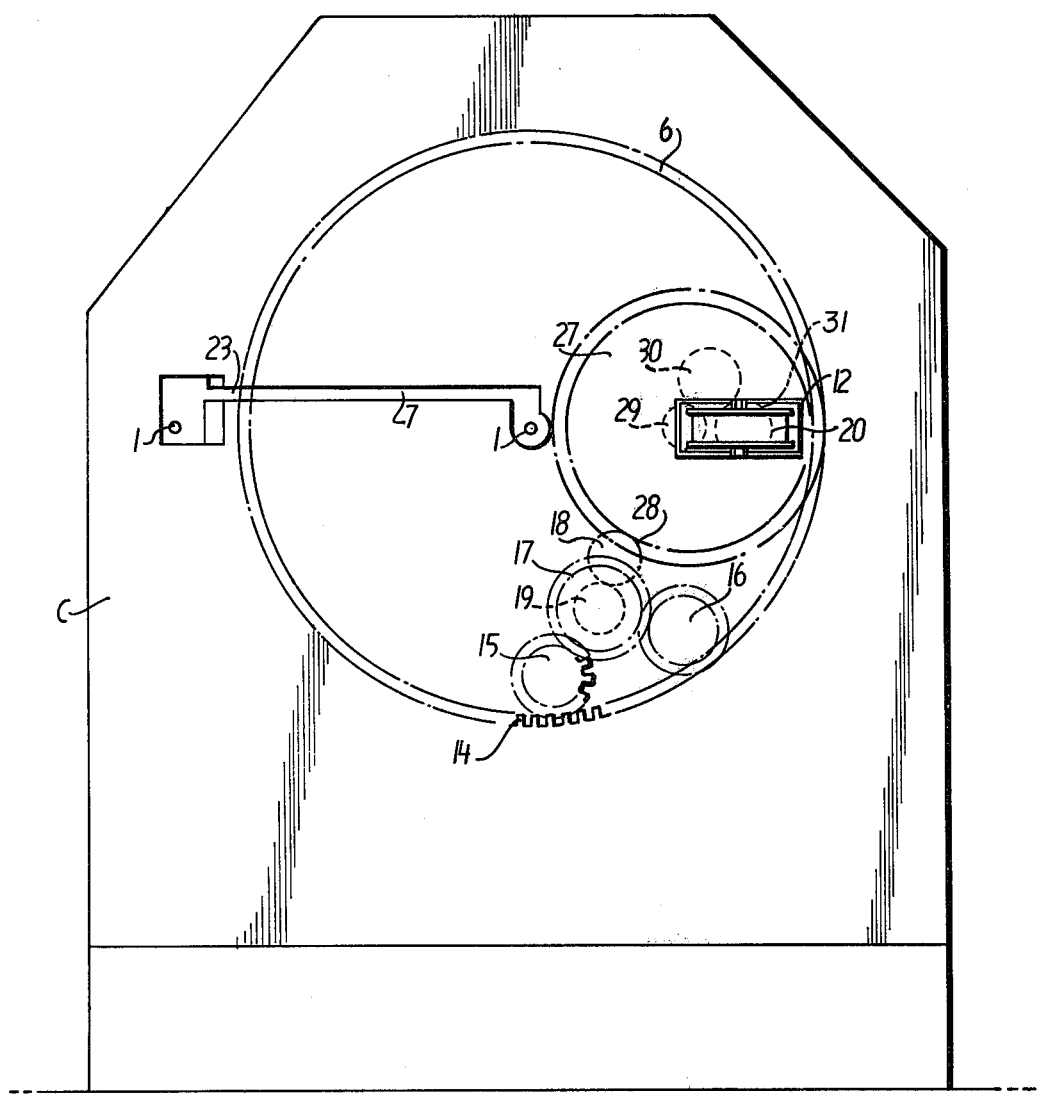
FIG. 9 is a view similar to FIG. 5, illustrating however another embodiment of the present invention which employs an eccentric mechanism as a component of the rotary transmission.

An embodiment of the apparatus which is provided with the aforementioned eccentric mechanism is illustrated in FIG. 9, wherein the drum support mechanism 12 is rotatably mounted upon an eccentric rotary body 27 which is in turn rotatably mounted upon the rotary body 6, a gear 28 being provided upon the periphery of body 27 so as to mesh with a suitable reduction driving gear 18. A rolling gear 31 connected to the drum support mechanism 12 meshes with an inner gear 30 provided upon the eccentric rotary body 27 which in turn meshes a gear 29 fixed upon the rotary body 6 and positioned at the center of the eccentric rotary body 27.

Hence, although one revolution of the rotary body 6 causes one revolution of the eccentric rotary body 27 and the drum support mechanism 12, the direction of rotation of the drum support mechanism 12 is reversed with respect to that of the rotary body 6, and consequently, the wire drum 20 can move along the elliptical path as shown in FIG. 8 with an increased rate of speed. It is noted that within the transmission mechanism provided to rotate the drum support mechanism 12 upon the rotary body 6 by means of the differential rotation between the rotary body 6 and the casing C, it is possible to reduce the weight of the transmission mechanism by utilizing transmission means, such as for example, worm gears, bevel gears, endless belts, or the like, in lieu of the drive gears 17, 18 and 19.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. An apparatus for winding a winding wire upon a core wire having an endless form, comprising:
    a core wire drive mechanism for rotating the core wire about its axis;
    a wire drum for storing said winding wire;
    a drum support mechanism for rotatably supporting said wire drum about a first axis;
    a rotary body for rotatably supporting said drum support mechanism coplanar therewith about a second axis and rotating the same around said core wire and through the endless form thereof, said body being provided with a slit for passing said core wire therethrough;
    a rotary body drive mechanism for rotating said rotary body;

means for limiting rotation of said wire drum to a single axis with respect to said drum support mechanism;

a semi-circular winding wire guide for changing the feeding direction of said winding wire by drawing out said winding wire from the tangential direction of said wire drum in relation to said wire guide, said guide extending between said first and second axes so as to confine the movement of said winding wire to a path extending from said first axis to said second axis in a semi-circular curved line; and means for synchronously rotating said guide with said rotary body.

2. An apparatus as set forth in claim 1, wherein said winding wire guide is mounted upon said rotary body.

3. An apparatus as set forth in claim 1, wherein a transmission mechanism is provided upon said rotary body for rotating said drum support mechanism independent of the rotational movement between said rotary body and a stationary portion of said apparatus.

4. An apparatus as set forth in claim 3, wherein said transmission mechanism comprises:

a stationary gear provided upon said stationary portion;
  at least one travelling gear meshing with said stationary gear and rotatably mounted upon said rotary body;
  a driving gear meshing with said travelling gear; and
  a rolling gear meshing with said driving gear and rotating with said drum support mechanism.

5. An apparatus as set forth in claim 4, wherein said transmission includes more than one of said travelling gears.

6. An apparatus as set forth in claim 3, wherein said transmission mechanism has a gear ratio whereby one revolution of said rotary body causes one revolution of said drum support mechanism with respect to said rotary body.

7. An apparatus as set forth in claim 1, wherein an eccentric mechanism is provided upon said rotary body for varying the distance between the rotational axis of said rotary body and the rotational axis of said drum support mechanism by means of rotation of said rotary body.

8. An apparatus as set forth in claim 1, wherein a synchronous mechanism is provided for synchronizing the rotational movements of said core wire drive mechanism and said rotary body drive mechanism.

9. An apparatus as set forth in claim 4, wherein said stationary gear is an inner gear.

10. An apparatus as set forth in claim 4, wherein said stationary gear is an outer gear disposed within said rotary body.

11. An apparatus as set forth in claim 1, wherein said wire drum is located such that a peripheral part of said wire drum is always at the center of said drum support mechanism during the rotational movement of said wire drum and said drum support mechanism.

* * * * *